United States Patent
Korneliussen (10) Patent No.: US 10,911,698 B2
(45) Date of Patent: Feb. 2, 2021

(54) ISP BIAS-COMPENSATING NOISE REDUCTION SYSTEMS AND METHODS

(71) Applicant: Huddly AS, Oslo (NO)

(72) Inventor: Jan Tore Korneliussen, Oslo (NO)

(73) Assignee: HUDDLY AS, Oslo (NO)

( * ) Notice: Subject to any disclaimer, the term of this patent is extended or adjusted under 35 U.S.C. 154(b) by 0 days.

(21) Appl. No.: 15/282,581

(22) Filed: Sep. 30, 2016

(65) Prior Publication Data
US 2018/0098004 A1 Apr. 5, 2018

(51) Int. Cl.
*H04N 5/357* (2011.01)
*G06T 5/50* (2006.01)
*G06T 5/00* (2006.01)

(52) U.S. Cl.
CPC .............. *H04N 5/357* (2013.01); *G06T 5/002* (2013.01); *G06T 5/50* (2013.01); *G06T 2207/20182* (2013.01)

(58) Field of Classification Search
CPC ........... H04N 5/357; G06T 5/002; G06T 5/50; G06T 2207/20182
See application file for complete search history.

(56) References Cited

U.S. PATENT DOCUMENTS

| | | | | |
|---|---|---|---|---|
| 6,094,512 A * | 7/2000 | Lin | ......................... | H04N 1/047 382/315 |
| 6,414,719 B1 * | 7/2002 | Parikh | ...................... | H04N 5/21 348/448 |
| 6,822,691 B1 * | 11/2004 | Kim | ........................ | H04N 5/144 348/451 |
| 6,847,738 B1 * | 1/2005 | Scognamiglio | ........ | H04N 5/208 348/E5.076 |
| 7,009,662 B2 * | 3/2006 | Ojo | ........................... | G06T 5/20 348/241 |
| 7,336,316 B2 * | 2/2008 | Fazzini | ................... | H04N 7/012 348/448 |
| 7,418,149 B2 * | 8/2008 | Dinh | ........................ | G06K 9/40 348/607 |
| 7,542,095 B2 * | 6/2009 | Zhou | ...................... | H04N 5/144 348/448 |
| 7,782,402 B2 * | 8/2010 | Lee | ........................... | H04N 9/77 348/606 |
| 8,059,207 B2 * | 11/2011 | Xu | ............................ | H04N 5/21 348/607 |

(Continued)

OTHER PUBLICATIONS

Stephen Boyd and Lieven Vandenberghe, Convex Optimization, Cambridge University Press, 2004.

*Primary Examiner* — Brian P Yenke
(74) *Attorney, Agent, or Firm* — Edgetech Law LLP (57) ABSTRACT

Systems and methods are provided for compensating bias introduced from various image signal processors (ISP) or ISP components while effectively reducing noise. An ISP stage such as spatial noise filtering, high dynamic range (HDR) interpolation, and demosaicking among others, often results in various types of biases and artifacts being introduced in the output frame. The methods and systems of this disclosure employ a convex combination of multiple input frames or blocks of pixels, to effectively reduce bias from a spatial noise filter, a debayer unit, or other ISP components, thereby providing improved spatiotemporal noise reduction solutions.

24 Claims, 6 Drawing Sheets

(56) References Cited

U.S. PATENT DOCUMENTS

| | | | | |
|---|---|---|---|---|
| 8,237,868 | B2* | 8/2012 | Takeda | G06T 3/40 |
| | | | | 348/607 |
| 8,553,783 | B2* | 10/2013 | Deng | H04N 5/213 |
| | | | | 348/606 |
| 9,319,668 | B2* | 4/2016 | Kannermark | H04N 17/002 |
| 9,609,308 | B2* | 3/2017 | Suzuki | H04N 13/271 |
| 2006/0203010 | A1* | 9/2006 | Kirchner | G09G 3/003 |
| | | | | 345/629 |
| 2016/0299968 | A1* | 10/2016 | Song | G06F 17/30843 |
| 2016/0328384 | A1* | 11/2016 | Divakaran | G06F 16/9535 |

\* cited by examiner

ISP BIAS-COMPENSATING NOISE REDUCTION SYSTEMS AND METHODS

BACKGROUND OF THE DISCLOSURE

The present disclosure relates in general to image signal processing. Specifically, the present disclosure relates to apparatus and methods for compensating bias introduced by image signal processors (ISPs) or ISP components while effectively reducing noise. More specifically, bias-compensating noise reduction systems and methods are provided for generating high-fidelity images and videos by reducing bias introduced from various ISPs or ISP components including spatial noise reduction filters, HDR interpolation units, and demosaicking units while effectively reducing noise.

Noise reduction has become an important aspect of image and video capturing systems as cameras and sensors with size of pixel continue to reduce while the availability of digital processing power continues to improve. In general, video noise reduction can be broadly divided into spatial noise filters and temporal noise filters. Spatial filters are known to use neighboring pixels in each video frame to produce each output pixel. Temporal filters are known to use consecutive pixels between frames to produce each output pixel. Spatial and temporal noise reduction filters can be used at the same time to produce better results.

Spatial noise reduction can be effective for still images, but most existing spatial noise reduction filters result in some form of bias such as smoothing textures and fine structure, or artifacts such as ringing or blockiness, in the final results. When applied to a video, spatial noise reduction can give rise to visible residual temporal variations between frames, which is not visible from a single frame.

Temporal noise reduction in one of its most common forms comprises averaging or in other ways combining pixels in stationary parts of the input frames. When a temporal filter converges slowly, i.e., few frames are available for combining pixels, the resulting images or videos would produce noise trails. And ghosting artifacts may occur where changing parts of the input frames are incorrectly classified as stationary.

When a spatial noise filter is used together with a temporal noise filter, they are often referred to jointly as 3-D noise reduction filters or spatiotemporal noise reduction filters. Existing forms of spatiotemporal filters, however, present some similar problems from either its component spatial noise filter or its component temporal noise filter. For example, where spatial filtering is applied first, such a spatiotemporal filter results in certain bias including the smoothing of texture and details. Where temporal filter is applied first, though, motion detection or estimation is not as effective due to noise. The convergence of recursive temporal filter can be slow as well. Where switching spatial and temporal filtering is implemented, on the other hand, motion detection remains not as effective due to noise and convergence of recursive temporal filter remains slow. In such switching spatial and temporal filtering systems, moreover, bias from spatial filtering would persist in non-stationary regions where temporal filter is not effective.

As is clear in existing systems, therefore, a classical ISP component such as a spatial noise filter may introduce bias in resulting images and videos, and thereby undercut the overall fidelity of a camera or video communication system powered by ISPs. Another example where an ISP introduces bias in the resulting images and videos is a demosaicking unit or debayer unit, which may cause smoothing, zippering artifacts, or false colors in the output frames. Additional examples include HDR (high dynamic range) interpolation on interleaved long and short exposure pixels, which introduces bias of its own.

There is, consequently, a need for improved methods and systems to reduce or compensate bias introduced by ISPs in camera and video communication systems and to generate high-fidelity images and videos.

SUMMARY OF THE VARIOUS EMBODIMENTS

It is therefore an object of this disclosure to provide methods and systems for reducing bias introduced by ISPs while effectively reducing noise, thereby generating high-fidelity images and videos.

Particularly, in accordance with this disclosure, there is provided, in one embodiment, a spatiotemporal noise reduction system for compensating bias from image signal processing of raw video signals. The system comprises an image signal processor which comprises a spatial noise reduction filter adapted to output each pixel based on neighboring pixels in each raw video frame; a signal change detector adapted to receive the output of the image signal processor and a previous output frame thereby detecting any signal changes in each pixel; a signal combiner adapted to receive more than two input frames and therefrom generate a combination output frame. The more than two input frames comprise a raw signal frame, an output from the image signal processor, and a previous output frame.

In another embodiment, the signal combiner is adapted to output a linear combination of the more than two input frames. In yet another embodiment, the signal combiner is adapted to output a convex combination of the more than two input frames.

In a further embodiment, the system further comprises a confidence updater adapted to determine a current confidence indicator by updating a previous confidence indicator for a previous output frame based on the detection of any signal changes received from the signal change detector. A convex combination weight is calculated for each input of the convex combination based on the current confidence indicator.

In another embodiment, the previous confidence indicator is assigned zero, for a first output frame from the raw video signals.

According to yet another embodiment, the system further comprises a motion compensator adapted to reduce motion based on the output from the image signal processor and the previous output frame. The more than two input frames of the signal combiner comprise the raw signal frame, the output from said image signal processor, and an output from the motion compensator.

In a further embodiment, the raw video signals comprise exposure mosaic having spatially interleaved long- and short exposure time pixels. The image signal processor further comprises a spatial HDR interpolation unit and a demosaicking unit. The more than two input frames comprise a raw signal frame, an output from the spatial HDR interpolation unit, an output from the demosaicking unit, and a previous output frame.

In another embodiment, the raw video signals comprise color mosaic having spatially interleaved different color pixel. The image signal processor further comprises a demosaicking unit. The more than two input frames comprises a raw signal frame, an output from the demosaicking unit, and a previous output frame.

According to another embodiment, the raw video signals comprise demosaicked frames.

In yet another embodiment, the raw video signals comprise frames that have not been processed by a spatial noise reduction filter and have not been demosaicked, and the image signal processor further comprises a demosaicking unit. The more than two input frames comprise a raw signal frame, an output from the demosaicking unit, and a previous output frame.

In a further embodiment, the signal combiner is adapted to output a linear combination of the more than two input frames.

In another embodiment, the signal combiner is adapted to output a convex combination of the more than two input frames.

In yet another embodiment, the system further comprises a confidence updater adapted to determine a current confidence indicator by updating a previous confidence indicator for a previous output frame based on the detection of any signal changes received from said signal change detector. A convex combination weight is calculated for each input of the convex combination based on the current confidence indicator.

In a further embodiment, the system further comprises a motion compensator adapted to reduce motion based on the output from the image signal processor and the previous output frame. The more than two input frames of the signal combiner comprise the raw signal frame, the output from the image signal processor, and an output from the motion compensator.

In accordance with this disclosure, there is provided, in one embodiment, a method for compensating bias from image signal processing of raw video signals. The method comprises: generating a linear combination of more than two input frames; and outputting the linear combination frame. The more than two input frames comprise a raw signal frame, an output from the image signal processing, and a previous output frame In another embodiment, the linear combination is a convex combination of more than two input frames.

In yet another embodiment, the method further comprises generating a signal change detection classifier for each block of pixels based on an output of the image signal processor and a previous output frame; updating a confidence indicator for a current output frame based on the signal change detection classifier and a previous confidence indicator for the previous output frame; and calculating a weight for each input frame of the convex combination based on the updated confidence indicator for the current output frame.

In a further embodiment, the calculating a weight for each input frame of the convex combination further comprises providing a decreasing function for the ratio between the weight for the output of the image signal processing and the weight for the unfiltered raw input frame based on the confidence indicator of the current output frame.

According to another embodiment, the decreasing function is a monotone decreasing function.

In yet another embodiment, the calculating a weight for each input frame of the convex combination further comprises providing an increasing function for the weight for the previous output frame based on the confidence indicator of the current output frame.

In a further embodiment, the confidence indicator is a numerical number having a range between zero and one.

According to another embodiment, the method further comprises reducing motion based on the output from the image signal processing and the previous output frame thereby generating a motion-compensated output. The convex combination is a convex combination of the raw signal frame, the output from the image signal processing, and the motion-compensated output.

According to yet another embodiment, the raw video signals are selected from the group consisting of (i) spatially interleaved long- and short exposure time pixels, (ii) color mosaic having spatially interleaved different color pixels, (iii) demosaicked frames, and (iv) non-spatially filtered and non-demosaicked frames. The image signal processing is selected from the group consisting of (i) spatial HDR interpolation, demosaicking, and spatial noise reduction filtering, (ii) demosaicking and spatial noise reduction filtering, and (iii) spatial noise reduction filtering.

In a further embodiment, the more than two input frames comprise a raw signal frame, a previous output frame, and an output from the group consisting of the spatial HDR interpolation, the demosaicking, and the spatial noise reduction filtering.

In another embodiment, the method further comprises reducing motion based on the output from the image signal processing and the previous output frame thereby generating a motion-compensated output. The convex combination is a convex combination of the raw signal frame, the motion-compensated output, and an output from the group consisting of the spatial HDR interpolation, the demosaicking, and the spatial noise reduction filtering.

According to yet another embodiment, the method further comprises generating a signal change detection classifier based on an output of said image signal processing and a previous output frame; determining a current confidence indicator for each pixel based on the signal change detection classifier and confidence indicators of neighboring pixels; and calculating a weight for each input frame for the convex combination based on the current confidence indicator.

DETAILED DESCRIPTION OF THE VARIOUS EMBODIMENTS

System and Methodology Overview

The methods and systems according to the various embodiments of this disclosure employ a weighted combination of multiple input frames or blocks of pixels as part of a recursive temporal noise filter, to reduce bias from an ISP such as a spatial noise filter, a demosaicking unit, or HDR interpolation unit, thereby providing improved noise reduction solutions. The bias-compensating and noise reduction system in various embodiments of this disclosure are designed to reduce biases introduced at an ISP stage of exposure mosaic interpolation, color demosaick interpolation, or spatial noise reduction filtering.

Figure 3:
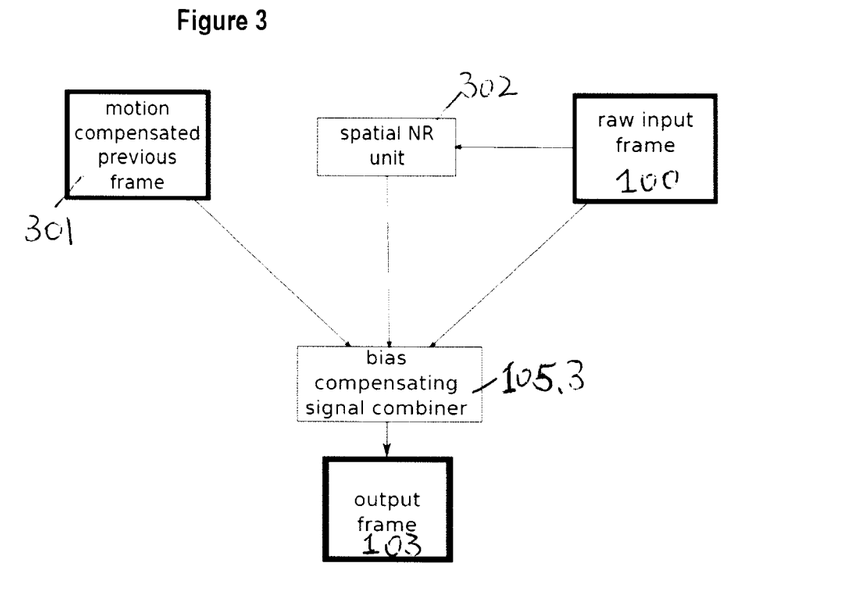
FIG. 3 depicts a bias-compensating spatiotemporal noise reduction system according to another embodiment.

In one embodiment, referring to FIG. 3, for example, a spatial noise reduction filter is the ISP that is combined with a low complexity temporal noise filter. The resulting spatiotemporal filter reduces bias from the spatial noise filter and at the same time reduces the disadvantages of temporal filtering. According to some embodiments, the spatial noise reduction filter is provided in hardware or firmware, and a temporal noise reduction filter is customized and implemented in software. A customized temporal filter of this disclosure may be combined with an existing spatial filter in certain embodiments, forming an extension to the existing equipment thereby providing an improved noise reduction solution.

In other embodiments where raw input data include spatially interleaved long- and short exposure time pixels or color mosaic having spatially interleaved different color pixels, a demosaicking unit or debayer unit is the ISP that is combined with a temporal noise filter. The resulting bias-compensating filter reduces the bias or artifacts from demosaicking and achieves higher fidelity in image or video output frames. In further embodiments, further ISPs including spatial noise filters are combined in the system along with the demosaicking unit and the recursive temporal filter. See, e.g., FIG. 4. The resulting bias-compensating filter reduces the bias or artifacts from the spatial noise filter and the debayer unit and achieves improved fidelity in the output frames.

Signal Combiner and Confidence Indicator

Figure 1:
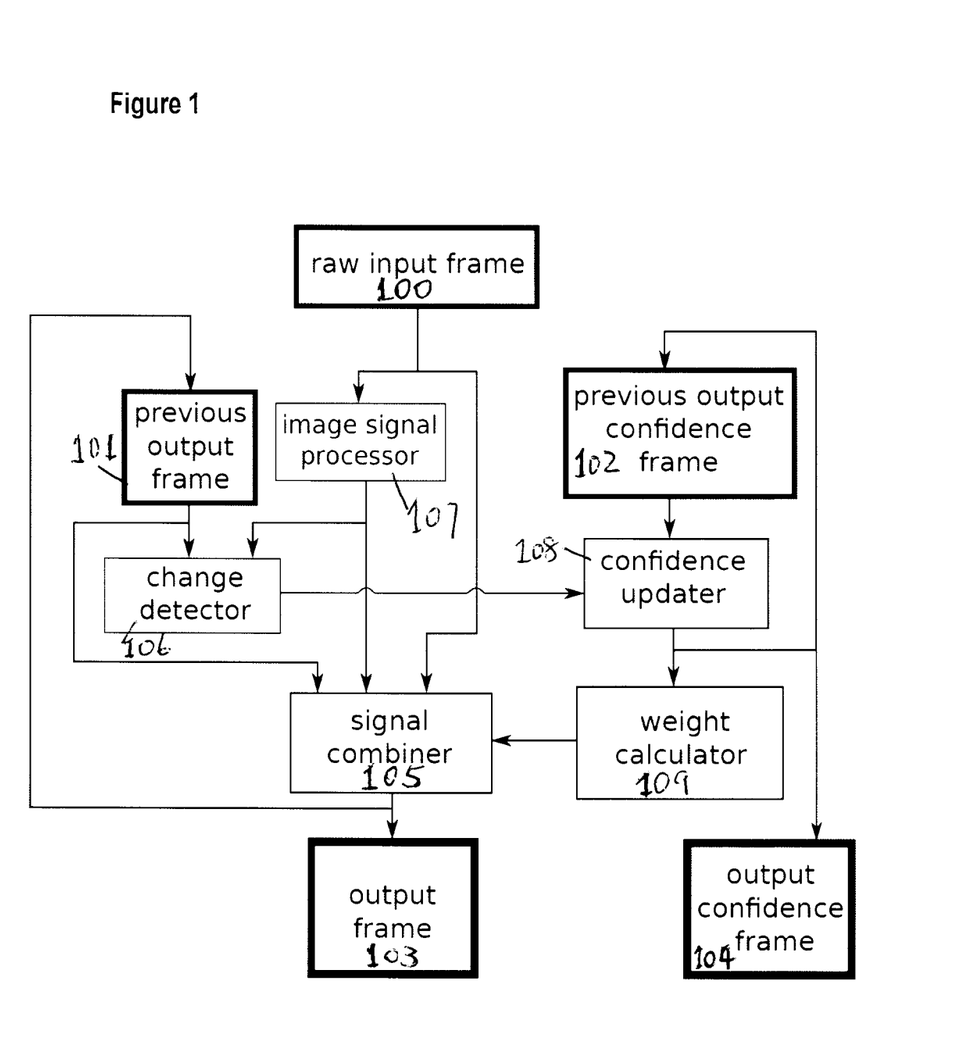
FIG. 1 depicts a bias-compensating noise reduction system according to one embodiment of this disclosure.

Referring to FIG. 1, a signal combiner (105) according to one embodiment is a central part of a recursive temporal filter of the present disclosure. The signal combiner provides a linear combination in one embodiment of at least two input frames, including the unfiltered input frame (100), the ISP-filtered input frame (107), and the previous output frame (105). In another embodiment, the signal combiner (105) provides a convex combination of at least two input frames, including the unfiltered input frame (100), the ISP-filtered input frame (107), and the previous output frame (105). The convex combination according to various embodiments are made per block of pixels or per pixels. A confidence indicator (102, 104) is associated with each convex combination per pixel or per block of pixels. The convex combination based on the updated confidence indicator determines the new output frame.

According to one embodiment, a confidence indicator (102, 104) is assigned for every input frame or block of pixels in each input frame. The confidence indicator in various embodiments generally represents the extent to which the previous output frame is a good representation of the current input frame. It is defined as a numerical number with a predetermined range, such as from 0 to 1 according to one embodiment. The confidence indicator is stored together with the pixel values in a frame buffer. It is calculated by a confidence updater (108) based on a confidence update function.

Figure 5:
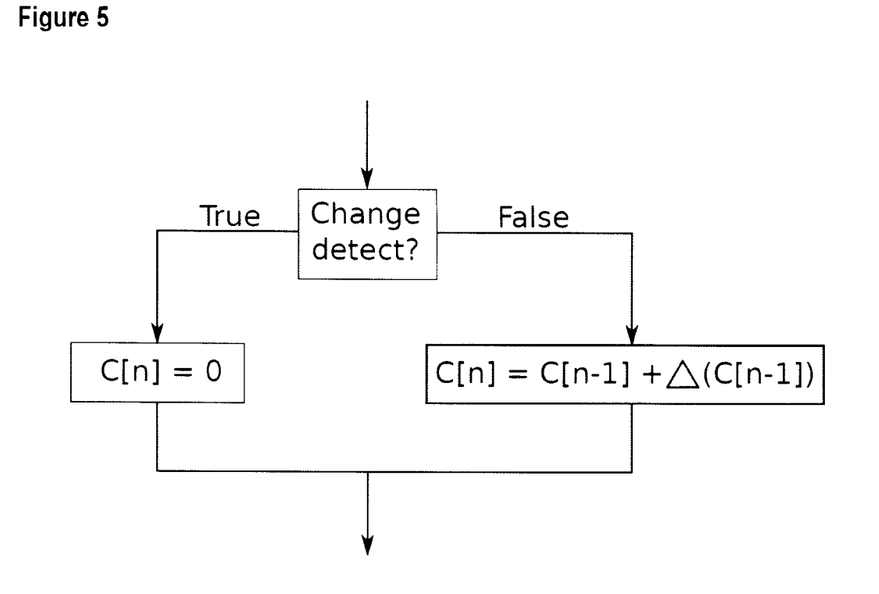
FIG. 5 depicts a confidence updater of the bias-compensating noise reduction system according to one embodiment.

Referring to FIG. 5, the confidence update function calculates the confidence indicator of the current frame or current block of pixels (C(n)) based on the confidence indicator of the previous output frame (C(n−1)) and a signal change classifier ("true" or "false") derived for each block of pixels.

In one embodiment, the updated confidence indicator is defined to be the previous confidence indicator for the previous frame or block of pixels plus a positive increment for pixels or blocks of pixels classified as stationary. And for pixels or blocks of pixels classified as changing, the updated confidence indicator is defined to be the lowest possible value for the system, such as 0 in some embodiments. The increment according to certain embodiments depends on the previous confidence indicator but is constrained such that the updated confidence indicator stays within a predetermined range, such as between 0 and 1 according to one embodiment. See, e.g., FIG. 5.

Referring to FIG. 1, the signal change classifier based on which the confidence indicator is calculated, is determined by a signal change detector (106) connected to an image signal processor (ISP) stage (107). The ISP stage according to a particular embodiment comprises a spatial noise reduction filter, and the signal change detector detects location changes in relevant blocks of pixels based on the output of the spatial filter and data from the previous output frame.

Convex Combination Weights

Referring to FIG. 1, the weight calculator (109) takes input form the confidence updater (108) in calculating convex combination weights for each input frames or block of pixels. According to one embodiment, the unfiltered raw input (100) is weighted more than the ISP-filtered input (107) or spatially filtered input (where the ISP is a spatial noise reduction filter) as the confidence indicator increases. Accordingly, the bias of the spatial filter is reduced as more frames are averaged in the process. When the confidence indicator for the previous output frame is low, on the other hand, the spatially filtered input is weighted more, thereby reducing the noise variance of the output.

Therefore, in certain embodiments, the ratio between the weight for the ISP-filtered input frame (107) and the weight for the unfiltered raw input frame (100) is a monotone decreasing function of the confidence indicator. Further, the weight for the previous output frame (101) is an increasing function of the confidence indicator. This weight for the previous output frame is zero or near zero when the confidence indicator is zero, and it is close to one when the confidence indicator is one according to certain embodiments.

Figure 6:
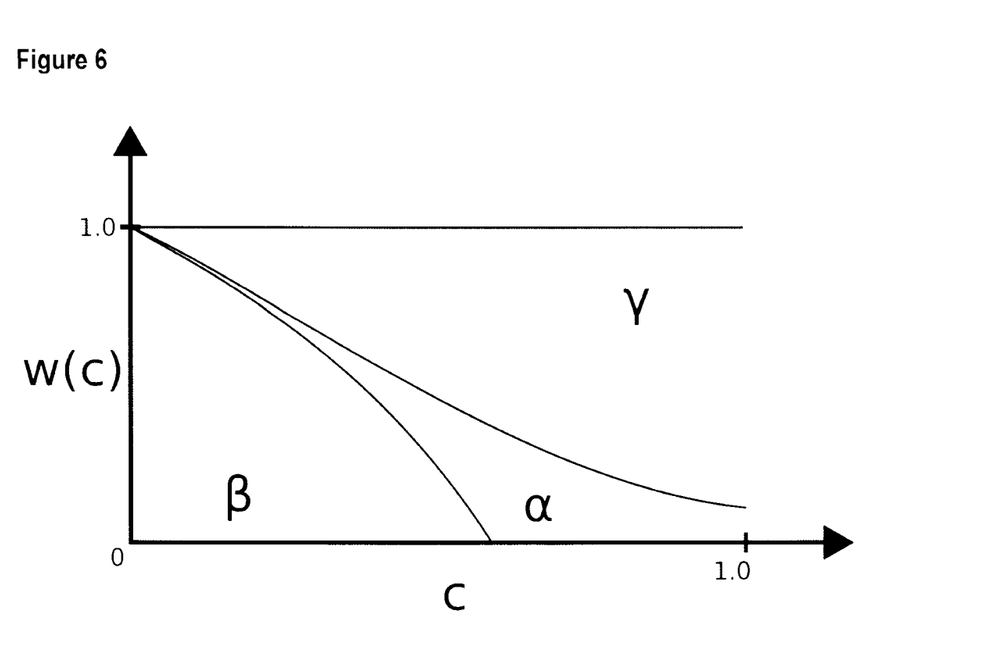
FIG. 6 shows the convex combination weight of each input of the convex combination calculated by a weight calculator of the bias-compensating noise reduction system according to one embodiment.

Referring to FIG. 6, convex combination weights according to one embodiment are derived by the following formula based on the confidence indicator: gamma=c, beta=(1.0−c)*(1.0−c), alpha=(1.0−c)*c, where c refers to the confidence indicator, alpha refers to the weight for the unfiltered raw input, beta refers to the weight of the ISP-filtered input or the spatially filtered input where the ISP is a spatial filter, and gamma refers to the weight for the previous output frame. In this embodiment, the sum of alpha, beta, and gamma is 1, and the confidence indicator has a value between 0 and 1. According to the way alpha and beta vary as a function of the confidence indicator for the previous frame in this embodiment, therefore, beta (weight for the ISP or spatial filtered frame) is high in the beginning of the processing such that convergence to a true pixel value occurs faster, while alpha (weight for the unfiltered raw input) increases gradually to reduce the bias from the ISP or the spatial filter where the ISP is a spatial filter.

In alternative embodiments, piecewise linear approximations may be adopted to derive the weights for each input frames or block of pixels in the combination output frame. The combination output frame is based on a linear combination or convex combination of more than two input frames in alternative embodiments.

Signal Change Detector

As discussed above, the confidence updater updates the confidence indicator for each block of pixel or each input frame based on a change detection classifier generated by the signal change detector in certain embodiments. See, e.g., FIGS. 1, 2, and 5. The signal change detector takes as its inputs the ISP-filtered signal (or the spatial filtered signal where the ISP is a spatial filter) together with the previous output frame, and outputs a binary change detection classifier ("true" or "false") per pixel or block of pixel indicating the status as "stationary" or "changing." For example, in a basic embodiment, the difference between the two inputs is evaluated, and a threshold is determined for the classification of "changing." A difference between the two inputs above the threshold leads to a "true" reading in the signal change classifier indicating "changing," otherwise a "false" reading in the signal change classifier indicating "stationary."

Figure 2:
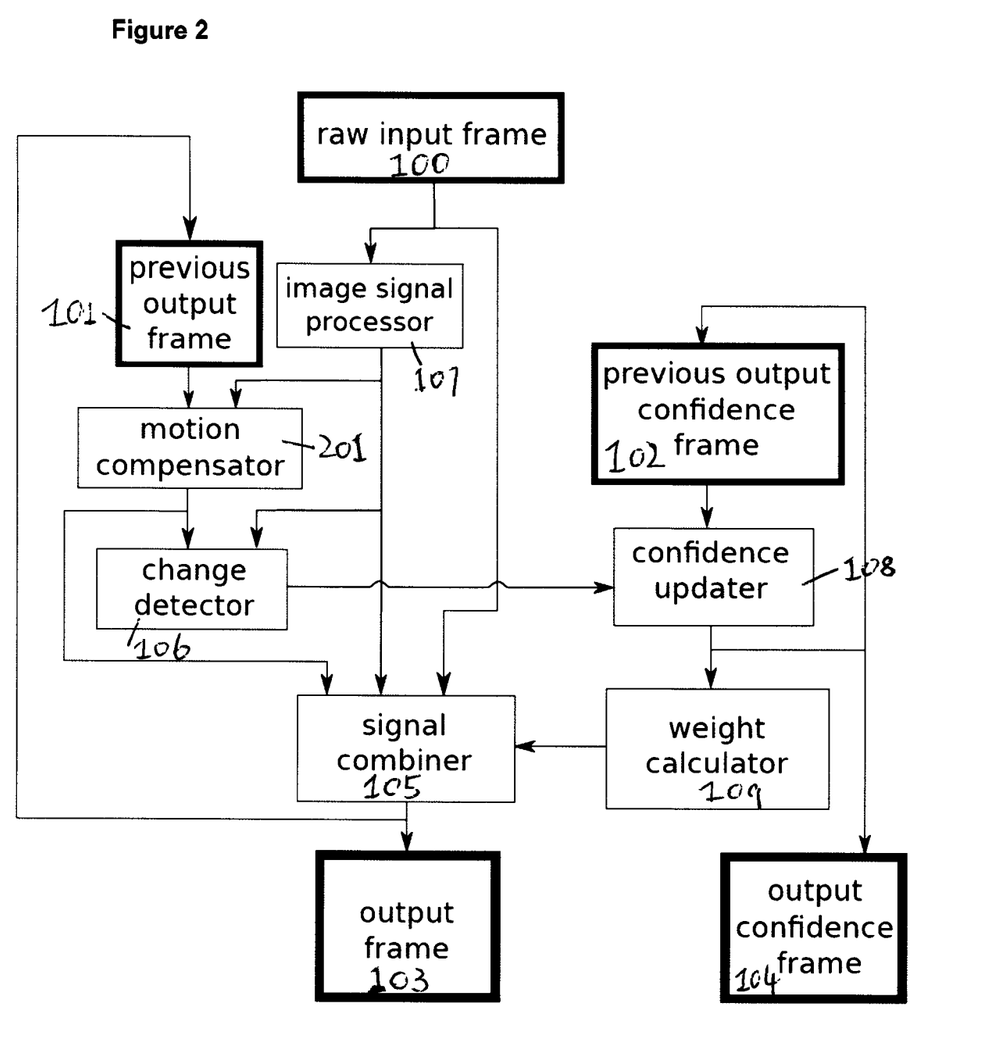
FIG. 2 depicts a bias-compensating noise reduction system according to another embodiment.

According to other embodiments, the signal change detector takes as inputs the spatial neighborhood of the pixels in the previous and the current input frame to improve the classification of signal change for the system. In further embodiments, the signal change classifier adopts background and foreground estimation algorithms to classify pixels as stationary or changing.

The bias-compensating noise reduction system according to various embodiments therefore provides the flexibility where the inputs to the signal change detector for the classification of change on the one hand, are decoupled from the inputs to the signal combiner for the convex combination forming the new output frame on the other hand. The inputs for determining the signal detection classifier are selected in various embodiments to maximize classification performance, while the inputs to the convex combination are selected to effectively reduce the visual degradations and biases of the ISPs such as spatial filters and debayer units employed by the system.

Motion Compensator

Referring to FIG. 2, the bias-compensating noise reduction system in another embodiment further comprises a motion compensator (201). The motion compensator (201) employs motion estimation techniques to modify the previous output frame (101), and compensates for motion between the previous output frame (101) and current input frame (100). As motion is estimated and compensated for, the bias-compensating noise reduction system according to this embodiment enables better opportunities for combining frames in the temporal dimension. For the convex combination, the motion compensated video frame is taken as an input frame in lieu of the previous output frame (101) according to this embodiment.

FIG. 3 provides another example of a bias-compensating spatiotemporal noise reduction system in which motion detection and compensation is implemented. In this embodiment, the convex combination (105.3) is based on the output from the motion compensator (301), the spatial-filtered input frame (302), and the unfiltered input frame (301).

Figure 4:
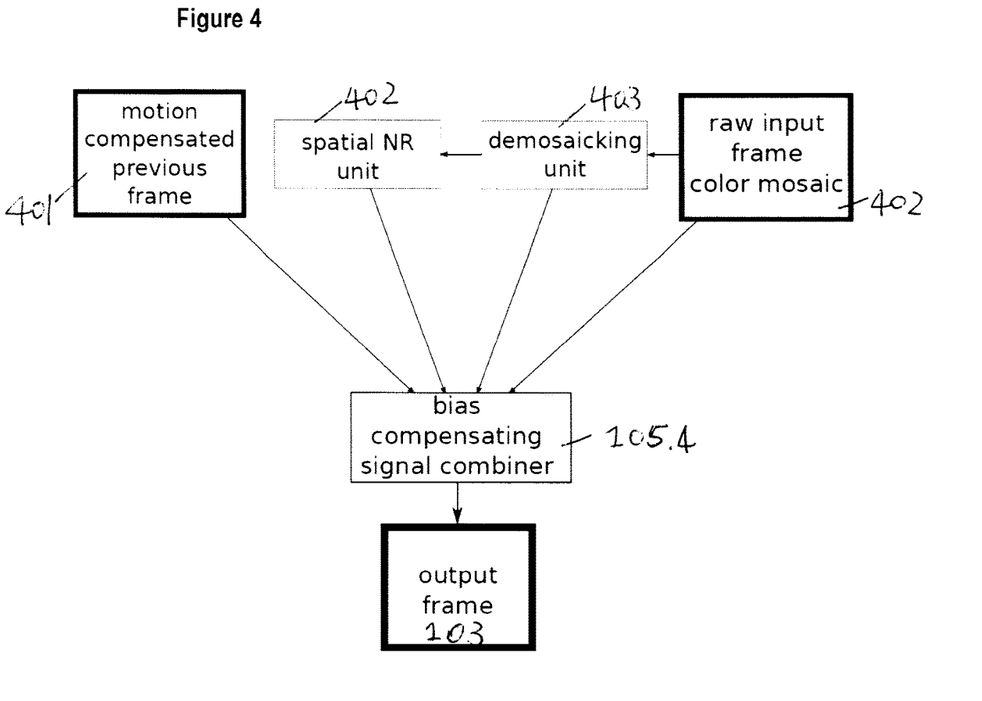
FIG. 4 depicts a bias-compensating spatiotemporal and debayer (demosaicking) noise reduction system according to another embodiment.

FIG. 4 provides a further example of a bias-compensating spatiotemporal and debayer noise reduction system in which motion detection and compensation is implemented. In this embodiment, the convex combination (105.4) is based on the output from the motion compensator (401), the spatial-filtered input frame (402), the debayered frame (403), and the raw bayer input frame (404).

ISP Stage and Corresponding Bias Reduction

As discussed above, the systems and methods of this disclosure reduce biases introduced by ISPs or ISP components during ISP-filtering of the raw input data, also referred to as an ISP stage. The raw input data to the system are of a variety of types in various embodiments. The ISP stage in various embodiments adopts and operates one or more ISPs of different utilities. In one embodiment, the ISP stage comprises exposure mosaic interpolation. In another embodiment, the ISP stage comprises color demosaick interpolation. In a further embodiment, the ISP stage comprises spatial noise reduction filtering.

For example, in certain embodiments block mosaic of long and short exposures, or interleaved lines with different exposures are generated by existing sensors. HDR sensing is adopted at the ISP stage in one embodiment. As spatial interleaving and spatial reconstruction are involved in HDR interpolation, which results in certain bias intrinsically, according to one embodiment an enhanced reconstruction with better qualities is provided via a convex combination based on weighted input frames including the raw interleaved exposure pixels, the biased spatial reconstruction, and the previous output frame.

In this embodiment therefore, the raw data is exposure mosaic, the ISP filtering stage is spatial HDR interpolation, demosaicking, and spatial noise filtering. In another embodiment, the raw data is color mosiac, the ISP filtering stages is demosaicking and spatial noise filtering. In a further embodiment, the raw data is demosaicked frame, and the ISP filtering stage is spatial noise filtering. The convex combination in various embodiments is made by combining weighted input frames including the raw data, the ISP filtered data, and the temporal filtered data (the previous output frame or the motion-compensated output).

The descriptions of the various embodiments provided in this disclosure, including the various figures and examples, are to exemplify and not to limit the invention and the various embodiments thereof.

I claim:

1. A noise reduction system for compensating bias from image signal processing of unprocessed video signals, comprising:
   an image signal processor comprising a spatial noise reduction filter adapted to output each pixel based on neighboring pixels in each unprocessed video frame;
   a signal change detector adapted to receive the output of said image signal processor and a previous output frame thereby detecting signal changes in each pixel;
   a signal combiner adapted to combine more than two input frames and generate a combination output frame thereby compensating bias from the image signal processor, said more than two input frames comprising an unprocessed signal frame, an output from said image signal processor, and a previous output frame.

2. The system of claim 1, wherein said signal combiner is adapted to output a linear combination of said more than two input frames.

3. The system of claim 2, wherein said signal combiner is adapted to output a convex combination of said more than two input frames.

4. The system of claim 3, further comprising a confidence updater adapted to determine a current confidence indicator by updating a previous confidence indicator for a previous output frame based on the detection of signal changes received from said signal change detector, wherein a convex combination weight is calculated for each input of the convex combination based on said current confidence indicator.

5. The system of claim 4, wherein said previous confidence indicator is assigned zero, for a first output frame from said unprocessed-video signals.

6. The system of claim 4, further comprising a motion compensator adapted to reduce motion based on the output from the image signal processor and the previous output frame, wherein said more than two input frames of the signal combiner comprises the unprocessed signal frame, the output from said image signal processor, and an output from said motion compensator.

7. A noise reduction system for compensating bias from image signal processing of unprocessed video signals, wherein said unprocessed video signals comprise exposure mosaic having spatially interleaved long- and short exposure time pixels, comprising
- an image signal processor comprising a spatial HDR interpolation unit; a signal change detector adapted to receive the output of said image signal processor and a previous output frame thereby detecting signal changes in each pixel;
- a signal combiner adapted to combine more than two input frames and generate a combination output frame thereby compensating bias from the image signal processor; wherein said more than two input frames comprising an unprocessed signal frame, an output from said spatial HDR interpolation unit, and a previous output frame.

8. The system of claim 7, wherein said signal combiner is adapted to output a linear combination of said more than two input frames.

9. The system of claim 8, wherein said signal combiner is adapted to output a convex combination of said more than two input frames.

10. The system of claim 9, further comprising a confidence updater adapted to determine a current confidence indicator by updating a previous confidence indicator for a previous output frame based on the detection of signal changes received from said signal change detector, wherein a convex combination weight is calculated for each input of the convex combination based on said current confidence indicator.

11. The system of claim 10, further comprising a motion compensator adapted to reduce motion based on the output from the image signal processor and the previous output frame, wherein said more than two input frames of the signal combiner comprises the unprocessed signal frame, the output from said image signal processor, and an output from said motion compensator.

12. A noise reduction system for compensating bias from image signal processing of unprocessed video signals, wherein said unprocessed video signals comprise color mosaic having spatially interleaved different color pixels, comprising
- an image signal processor comprising a demosaicking unit;
- a signal change detector adapted to receive the output of said image signal processor and a previous output frame thereby detecting signal changes in each pixel;
- a signal combiner adapted to combine more than two input frames and generate a combination output frame thereby compensating bias from the image signal processor, and wherein said more than two input frames comprise an unprocessed signal frame, an output from said demosaicking unit, and a previous output frame.

13. The system of claim 12, wherein said signal combiner is adapted to output a linear combination of said more than two input frames.

14. The system of claim 13, wherein said signal combiner is adapted to output a convex combination of said more than two input frames.

15. The system of claim 14, further comprising a confidence updater adapted to determine a current confidence indicator by updating a previous confidence indicator for a previous output frame based on the detection of signal changes received from said signal change detector, wherein a convex combination weight is calculated for each input of the convex combination based on said current confidence indicator.

16. The system of claim 15, further comprising a motion compensator adapted to reduce motion based on the output from the image signal processor and the previous output frame, wherein said more than two input frames of the signal combiner comprise the unprocessed signal frame, the output from said image signal processor, and an output from said motion compensator.

17. A method for compensating bias from image signal processing of unprocessed video signals, comprising: generating a convex combination of more than two input frames, said more than two input frames comprising an unprocessed signal frame, an output from said image signal processing, and a previous output frame; generating a signal change detection classifier for each block of pixels based on an output of said image signal processing and the previous output frame; updating a confidence indicator for a current output frame based on said signal change detection classifier and a previous confidence indicator for the previous output frame; and calculating a weight for each input frame of the convex combination based on the updated confidence indicator for the current output frame; and outputting said convex combination frame.

18. The method of claim 17, wherein calculating a weight for each input frame of the convex combination further comprises providing a decreasing function for the ratio between the weight for the output of the image signal processing and the weight for the unfiltered unprocessed input frame based on the confidence indicator of the current output frame.

19. The method of claim 18, wherein said decreasing function is a monotone decreasing function.

20. The method of claim 18, wherein calculating a weight for each input frame of the convex combination further comprises providing an increasing function for the weight for the previous output frame based on the confidence indicator of the current output frame.

21. The method of claim 18, wherein the confidence indicator is a numerical number having a range between zero and one.

22. The method of claim 17, further comprising reducing motion based on the output from said image signal processing and the previous output frame thereby generating a motion-compensated output, wherein said convex combination is a convex combination of the unprocessed signal frame, the output from said image signal processing, and said motion-compensated output.

23. The method of claim 22, further comprising reducing motion based on the output from said image signal processing and the previous output frame thereby generating a motion-compensated output, wherein said convex combination is a convex combination of the unprocessed signal frame, the motion-compensated output, and an output from the group consisting of the spatial HDR interpolation, the demosaicking, and the spatial noise reduction filtering.

24. The method of claim 23, further comprising generating a signal change detection classifier based on an output of said image signal processing and a previous output frame; determining a current confidence indicator for each pixel based on said signal change detection classifier and confidence indicators of neighboring pixels; and calculating a weight for each input frame for the convex combination based on said current confidence indicator.

* * * * *